Figure 1:
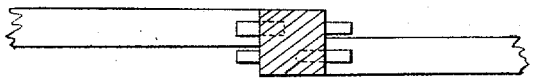
Figure 2:
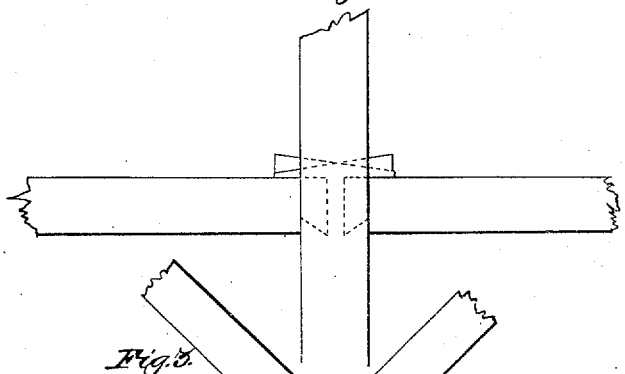
Figure 3:
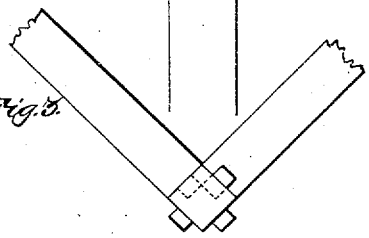
Figure 4:
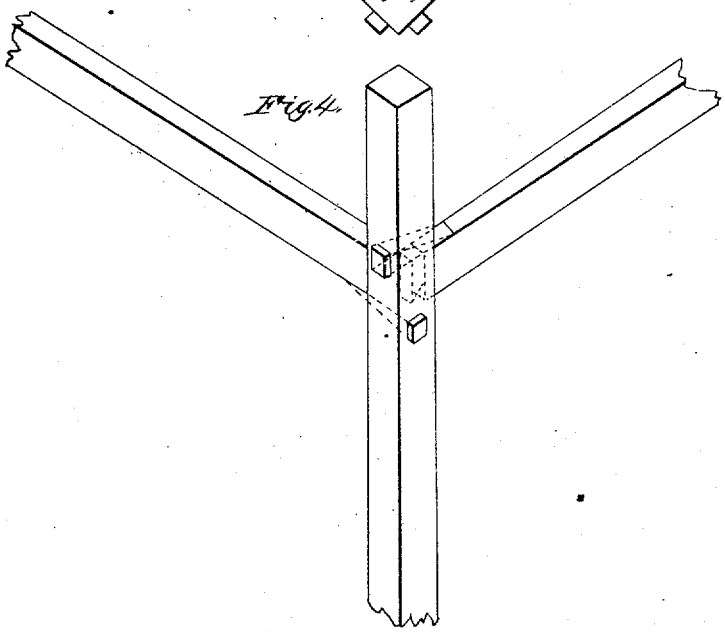

9542X

Batchelor & Thomas.

Constructing Houses.

Patented Mar. 30, 1836.

THE GRAPHIC CO. PHOTO-LITH. 39 & 41 PARK PLACE, N.Y.

Mar. 30. 1836

Solomon C Batchelor and Nelson S C Thomas of Watertown N Y.
Letters Patent
The Schedule referred to in these Letters Patent and making part of
the same containing a description in the words of the said Solomon
C Batchelor and Nelson S Thomas themselves of their improve
ment in forming joints in wood work.

To all to whom these presents shall come. Be it known that we
Solomon C Batchelor and Nelson S Thomas of Watertown in the
County of Jefferson and State of New York, have invented a new
and useful improvement in forming joints in wood work such as
Bedsteads, machine frames &c whereby rails or other named hor
izontal pieces may be framed and secured at right angles on two
or more sides into an upright post on the same level, and that
the following is a full and exact description thereof.
The tenon is formed by a dove tail on one edge the other edge
being straight and on a line with the face of the timber or rail
the shoulder on the dove tail edge should be of the dimension
of nearly half the diameter or measure of the key which is to hold
the tenon after it is inserted in the mortise. The mortise after being
laid out of exactly the dimensions of the tenon is to have added to
it the size of the key hole, which key hole is to be on the straight edge
of the tenon and must be so laid out as that the smallest end shall
have half its dimensions or diameter above (or below as the case may
be) the [illegible] edge of the tenon the whole being bored on such level
[illegible] as to come out on the opposite side of the post in full
diameter above (or below as the case may be) the line of the [illegible] edge
of the tenon. In order to frame two rails into a post at right angles
the dovetail of the tenons is reversed, the mortises being in like man
ner reversed. The mortises will be bent till they meet [illegible] in the
post, and the length of the tenon made accordingly. The key hole
should be bored before the mortise is bent. Where rails enter a post
opposite each other the tenons should be laid out so as to come

3/30/1836 9542X

358.

on opposite sides of an imaginary line in the post. The joints are to be secured by keys, the round key flattened at one end so as to fill the hole above (or below) the tenon is the most preferable.

What we claim as our own invention and not previously known in the above description is being able to frame and secure by means of keys right angled work where the rails or timbers are on the same level of whatever material metal or wood. We also claim whatever variation where the same principle is involved

Dated Watertown N.Y. Dec 7 1835

Copd Witnesses
N.W.G. Clark Rice
M. W. Gilbert

Solomon C. Batchelor
Nelson G. Thomas (533 Words)

(Granted March 30. 1836.)

Drawing